(12) United States Patent
Hironaga et al.

(10) Patent No.: US 10,190,022 B2
(45) Date of Patent: Jan. 29, 2019

(54) ANTIFOULING COMPOSITION, ANTIFOULING SHEET, AND METHOD FOR MANUFACTURING ANTIFOULING SHEET

(71) Applicant: LINTEC CORPORATION, Itabashi-ku (JP)

(72) Inventors: Maki Hironaga, Saitama (JP); Yumiko Amino, Funabashi (JP); Sou Miyata, Shiraoka (JP); Yoshitomo Ono, Kawaguchi (JP)

(73) Assignee: LINTEC CORPORATION, Itabashi-ku (JP)

( * ) Notice: Subject to any disclaimer, the term of this patent is extended or adjusted under 35 U.S.C. 154(b) by 0 days.

(21) Appl. No.: 15/545,486

(22) PCT Filed: Jan. 18, 2016

(86) PCT No.: PCT/JP2016/051212
§ 371 (c)(1),
(2) Date: Jul. 21, 2017

(87) PCT Pub. No.: WO2016/121544
PCT Pub. Date: Aug. 4, 2016

(65) Prior Publication Data
US 2018/0010011 A1    Jan. 11, 2018

(30) Foreign Application Priority Data

Jan. 26, 2015   (JP) ................. 2015-012642

(51) Int. Cl.
| | |
|---|---|
| *C09D 5/16* | (2006.01) |
| *C09D 183/14* | (2006.01) |
| *B32B 27/00* | (2006.01) |
| *C09K 3/18* | (2006.01) |
| *B32B 27/28* | (2006.01) |
| *C09D 183/04* | (2006.01) |
| *C09D 183/16* | (2006.01) |
| *C08G 77/62* | (2006.01) |
| *C08G 77/14* | (2006.01) |

(52) U.S. Cl.
CPC ............ *C09D 183/14* (2013.01); *B32B 27/00* (2013.01); *B32B 27/283* (2013.01); *C09D 5/16* (2013.01); *C09D 5/1675* (2013.01); *C09D 183/04* (2013.01); *C09D 183/16* (2013.01); *C09K 3/18* (2013.01); *B32B 2307/73* (2013.01); *C08G 77/14* (2013.01); *C08G 77/62* (2013.01)

(58) Field of Classification Search
CPC ...... C09D 5/16; C09D 5/1675; C09D 183/04; C09D 183/14; C09D 183/16; C09K 3/18
USPC ........................................................ 523/122
See application file for complete search history.

(56) References Cited

FOREIGN PATENT DOCUMENTS

| | | |
|---|---|---|
| JP | 2010-285574 A | 12/2010 |
| JP | 2011-148844 A | 8/2011 |
| JP | 2012-153849 A | 8/2012 |
| JP | 2014-139301 A | 7/2014 |

OTHER PUBLICATIONS

Machine translation of JP 2014-139301 original date (2014).*
International Search Report dated Apr. 19, 2016 in PCT/JP2016/051212 filed Jan. 18, 2016.

* cited by examiner

*Primary Examiner* — Edward J Cain
(74) *Attorney, Agent, or Firm* — Oblon, McClelland, Maier & Neustadt, L.L.P.

(57) ABSTRACT

Provided is an antifouling composition including a polysilazane-based compound (A) and a both terminal carboxy-modified silicone (B), the content of the component (B) being from 0.01 to 10 parts by mass based on 100 parts by mass of the total amount of the component (A), and the antifouling composition serves as a sheet-like antifouling layer-forming material. The antifouling composition is able to form a sheet-like antifouling layer having favorable surface state and curability and also having excellent water repellency such that even when a tilt angle is small, water droplets can be slipped off.

12 Claims, 1 Drawing Sheet

ANTIFOULING COMPOSITION, ANTIFOULING SHEET, AND METHOD FOR MANUFACTURING ANTIFOULING SHEET

TECHNICAL FIELD

The present invention relates to an antifouling composition serving as a forming material of a sheet-like antifouling layer, an antifouling sheet including a sheet-like antifouling layer formed of the antifouling composition, and a method for producing the antifouling sheet.

BACKGROUND ART

In general, it is desirable that water droplets, stains, and so on that may hinder vision do not adhere to the surfaces of windows for buildings, windows for automobiles, windshields for cars, airplanes, ships, and so on, aquariums, ship bottom windows, undersea lives adhesion preventing films for ship bottoms, road panels, such as soundproof walls, etc., mirrors installed in bathrooms, and so on, and molded articles, such as glass chambers, glass accessories, and etc.

By coating the surfaces of such molded articles with a coating film formed of an antifouling substance, or by sticking an antifouling sheet thereto, the surfaces are given water repellency or antifouling properties.

In order to impart water repellency or antifouling properties to molded articles, it is known that a coating film that includes a fluorine-containing compound, such as a fluororesin, etc., is formed on the surfaces of molded articles.

For example, PTL 1 discloses a water-repellent film-coated article, in which glass or the like serving as a substrate is coated with a laminate having an underlayer formed of an inorganic compound and a water-repellent film formed of a fluorine-containing compound, which coats the surface of the underlayer.

However, the water-repellent film-coated article described in PTL 1 has a water-repellent film formed of a fluorine-containing compound and is therefore unfavorable from the viewpoint of environmental protection.

For that reason, various investigations regarding an antifouling material capable of forming a coating film that does not include a fluorine-containing compound are made.

For example, PTL 2 discloses an organic polysilazane paint containing an organic polysilazane and a silicone oil as an organic polysilazane paint capable of forming a uniform coating film.

In addition, PTL 3 discloses a coating agent containing an organic polysilazane which when subjected to film formation, has a water contact angle of 70 degrees or more, a curing catalyst, and a reactive silicone oil having at least one reactive functional group in a molecule thereof, as a coating agent which may form a coating film having excellent quick-drying properties and capable of maintaining gloss, water repellency, and the like over a long period of time.

CITATION LIST

Patent Literature

PTL 1: JP 2010-285574A
PTL 2: JP 2011-148844A
PTL 3: JP 2014-139301A

SUMMARY OF INVENTION

Technical Problem

Now, as a result of review made by the present inventors, according to the paint or coating agent as specifically described in PTLs 2 and 3, it was noted that since the content of the silicone oil relative to the organic polysilazane is large, even when molded into a sheet-like material, the surface state or curability of the surface of the molded sheet-like material is inferior. In particular, in the case where it is contemplated to coat the paint or coating agent as described in PTLs 2 and 3 on a resin film to form a sheet-like antifouling layer, in coating on a resin film, cissing is liable to be generated, and the surface state of the formed sheet-like antifouling layer is remarkably inferior.

In the first place, the paint or coating agent as described in PTLs 2 and 3 is one for forming a water-repellent film through direct coating or painting on the surface of a subject article but not an antifouling material on the supposition that it is molded in a sheet-like material.

In addition, articles covered with a coating film formed of the paint or coating agent as described in PTLs 2 and 3 are insufficient in water droplet slipping properties in a place with a small tilt angle on the surface having the coating film, so that the water droplets are liable to adhere as they are.

Namely, even when a coating film is formed on the surface of an article with a small tilt angle by using such a paint or coating agent, there is a case where it is difficult to impart sufficient water droplet slipping properties to the article.

An object of the present invention is to provide an antifouling composition which may form an antifouling layer with favorable surface state and curability and which may also form a sheet-like antifouling layer having excellent water repellency such that even when a tilt angle is small, water droplets can be slipped off, an antifouling sheet including a sheet-like antifouling layer formed of the antifouling composition, and a method for producing an antifouling sheet.

Solution to Problem

The present inventors have found that an antifouling composition serving as a sheet-like antifouling layer-forming material, which includes a polysilazane compound and a both terminal carboxy-modified silicone in a predetermined proportion, is able to solve the aforementioned problem, leading to accomplishment of the present invention.

Specifically, the present invention provides the following [1] to [12].

[1] An antifouling composition including a polysilazane-based compound (A) and a both terminal carboxy-modified silicone (B), the content of the component (B) being from 0.01 to 10 parts by mass based on 100 parts by mass of the total amount of the component (A), and the antifouling composition serves as a sheet-like antifouling layer-forming material.

[2] The antifouling composition as set forth above in [1], wherein the component (A) includes an organic polysilazane-based compound (A1) having at least a repeating unit represented by the following general formula (1-1):

wherein,
p is an integer of 0 to 3;
$R^{A1}$ and $R^{B1}$ are each independently a hydrogen atom or an unsubstituted or substituted hydrocarbon group;
$L^{C1}$ is a single bond, an unsubstituted or substituted alkylene group, or —$(CH_2)_q$—NH—$(CH_2)_r$—, wherein q and r are each independently an integer of 0 or more;
$R^{D1}$s are each independently a hydrogen atom, a hydroxyl group, an unsubstituted or substituted alkyl group having a carbon number of 1 to 10, an unsubstituted or substituted alkenyl group having a carbon number of 1 to 10, or an unsubstituted or substituted aryl group having a ring-forming carbon number of 6 to 18; and
$R^{E1}$s are each independently an unsubstituted or substituted alkyl group having a carbon number of 1 to 10, an unsubstituted or substituted alkenyl group having a carbon number of 1 to 10, or an unsubstituted or substituted aryl group having a ring-forming carbon number of 6 to 18, provided that
in the case where plural $R^{D1}$s are present, the plural $R^{D1}$s may be the same as or different from each other; and in the case where plural $R^{E1}$s are present, the plural $R^{E1}$s may be the same as or different from each other.
[3] The antifouling composition as set forth above in [1] or [2], wherein the component (B) includes a compound (B1) represented by the following general formula (2):

(2)

wherein,
n is an integer of 1 or more;
$L^1$ and $L^2$ are each independently an unsubstituted or substituted alkylene group or an unsubstituted or substituted oxyalkylene group; and
$R^1$ to $R^6$ are each independently a hydrogen atom, an unsubstituted or substituted alkyl group having a carbon number of 1 to 10, an unsubstituted or substituted aryl group having a ring-forming carbon number of 6 to 24, an unsubstituted or substituted haloalkyl group having a carbon number of 1 to 10, or an unsubstituted or substituted alkylaryl group having a carbon number of 7 to 25, provided that in the case where plural $R^3$s and $R^4$s are present, the plural $R^3$s and $R^4$s may be the same as or different from each other, respectively.
[4] The antifouling composition as set forth above in any one of [1] to [3], further including an organic solvent solution (C) having hydrogen chloride dissolved therein.
[5] The antifouling composition as set forth above in [4], wherein the organic solvent for dissolving hydrogen chloride therein in the component (C) is at least one selected from the group consisting of an ether-based solvent and acetic acid.
[6] The antifouling composition as set forth above in [4] or [5], wherein the content of the hydrogen chloride is from 0.01 to 10 parts by mass based on 100 parts by mass of the total amount of the component (A) and the component (B).
[7] The antifouling composition as set forth above in any one of [1] to [6], wherein the content of water in the antifouling composition is 5% by mass or less.

[8] The antifouling composition as set forth above in any one of [1] to [7], wherein in curing a coating film formed of the antifouling composition in an environment at 110° C., a curing time is within 30 minutes.
[9] An antifouling sheet including a sheet-like antifouling layer formed of the antifouling composition as set forth above in any one of [1] to [8].
[10] The antifouling sheet as set forth above in [9], including the antifouling layer on a substrate.
[11] The antifouling sheet as set forth above in [10], wherein the substrate is a resin film.
[12] A method for producing an antifouling sheet, including the following Steps (1) to (3):
Step (1): a step of preparing the antifouling composition as set forth above in any one of [1] to [8];
Step (2): a step of forming a coating film on a substrate or a release material by using the antifouling composition; and
Step (3): a step of curing the coating film in an environment at 70 to 150° C. to form a sheet-like antifouling layer.

Advantageous Effects of Invention

The sheet-like antifouling layer formed of the antifouling composition of the present invention has favorable surface state and curability and also has excellent water repellency such that even when a tilt angle is small, water droplets can be slipped off.

DESCRIPTION OF EMBODIMENTS

In the present specification, the "active components" contained in the antifouling composition basically refer to components other than a solvent such as water, an organic solvent, etc., which are contained in the antifouling composition.
In the present specification, the carbon number of the description, for example, "unsubstituted or substituted alkyl group having a carbon number of X to Y" or the like indicates that the carbon number of the alkyl group is X to Y, and in the case where the alkyl group has a substituent, the carbon number of the substituent is not included. Other analogous expressions are also the same.
In the present specification, the term "unsubstituted" means that the group is not substituted with a substituent, but a hydrogen atom is bonded thereto.
In the present specification, the "ring-forming carbon number" expresses a number of carbon atoms contained in atoms constituting the ring itself in the compound of a structure in which the atoms are bonded in a ring form. In the case where the ring is substituted with a substituent, carbon or carbons contained in the substituent are not included in the ring-forming carbon number.
[Antifouling Composition]
The antifouling composition of the present invention serves as a sheet-like antifouling layer-forming material and includes a polysilazane-based compound (A) (hereinafter also referred to as "component (A)") and a both terminal carboxy-modified silicone (B) (hereinafter also referred to as "component (B)").

From the viewpoint of more improving the curability of the antifouling layer to be formed, it is preferred that the antifouling composition as an embodiment of the present invention further includes an organic solvent solution (C) having hydrogen chloride dissolved therein (hereinafter also referred to as "component (C)").

The antifouling composition as an embodiment of the present invention may contain any other additive than the components (A) to (C) within a range where the advantageous effects of the present invention are not impaired.

Each of the components which are contained in the antifouling composition of the present invention is hereunder described.

<Polysilazane-Based Compound (A)>

The polysilazane-based compound (A) which is used in the present invention is not particularly limited so long as it is a compound having a silicon-nitrogen bond.

The polysilazane-based compound (A) may be used either alone or in combination of two or more thereof and may also be a modified product of a polysilazane-based compound.

A number average molecular weight (Mn) of the polysilazane-based compound (A) which is used in an embodiment of the present invention is preferably 100 to 50,000, more preferably 300 to 10,000, and still more preferably 500 to 5,000.

In the present specification, the value of the number average molecular weight (Mn) is a value as expressed in terms of standard polystyrene, as measured by the gel permeation chromatography (GPC).

In the antifouling composition as an embodiment of the present invention, the content of the component (A) is preferably 60% by mass or more, more preferably 70% by mass or more, still more preferably 80% by mass or more, and yet still more preferably 90% by mass or more, and preferably 99.9% by mass or less relative to the total amount (100% by mass) of the active components in the antifouling composition.

As the polysilazane-based compound (A) which is used in the present invention, for example, a compound having a repeating unit represented by the following general formula (1) is exemplified.

The compound may be a compound including a chain structure having the repeating unit represented by the following general formula (1), or may be a compound including a cyclic structure having the repeating unit represented by the following general formula (1).

The compound may be a compound including one kind or two or more kinds of the repeating unit represented by the following general formula (1).

(1)

In the general formula (1), $R^A$, $R^B$, and $R^C$ are each independently a hydrogen atom, an unsubstituted or substituted hydrocarbon group, an unsubstituted or substituted alkoxy group, a substituted amino group having one or more substituents selected from a hydrocarbon group, or a substituted silyl group having one or more substituents selected from a hydrocarbon group and an alkoxy group.

Examples of the hydrocarbon group which may be selected for $R^A$, $R^B$, and $R^C$ and the hydrocarbon group which each of the substituted amino group and the substituted silyl group has include an alkyl group, a cycloalkyl group, an alkenyl group, an aryl group, and the like.

The carbon number of the aforementioned alkyl group is preferably 1 to 10, more preferably 1 to 6, and still more preferably 1 to 3.

Examples of the alkyl group include a methyl group, an ethyl group, a n-propyl group, an isopropyl group, a n-butyl group, an isobutyl group, a s-butyl group, a t-butyl group, a n-pentyl group, an isopentyl group, a neopentyl group, a n-hexyl group, a n-heptyl group, a n-octyl group, a 2-ethylhexyl group, a n-nonyl group, a n-decyl group, and the like.

The ring-forming carbon number of the aforementioned cycloalkyl group is preferably 3 to 8, more preferably 3 to 6, and still more preferably 5 or 6.

Examples of the cycloalkyl group include a cyclopropyl group, a cyclobutyl group, a cyclopentyl group, a cyclohexyl group, a cycloheptyl group, a cyclooctyl group, and the like.

The carbon number of the aforementioned alkenyl group is preferably 2 to 10, and more preferably 2 to 5.

Examples of the alkenyl group include a vinyl group, a 1-propenyl group, a 2-propenyl group, a 1-butenyl group, a 2-butenyl group, a 3-butenyl group, and the like.

The ring-forming carbon number of the aforementioned aryl group is preferably 6 to 18, more preferably 6 to 15, and still more preferably 6 to 12.

Examples of the aryl group include a phenyl group, a biphenyl group, a triphenyl group, a naphthyl group, an anthracenyl group, a benzyl group, a 1-phenylethyl group, a 2-phenylethyl group, an o-methylbenzyl group, a m-methylbenzyl group, a p-methylbenzyl group, and the like.

The carbon number of the aforementioned alkoxy group is preferably 1 to 10, more preferably 1 to 6, sill more preferably 1 to 3, and yet still more preferably 1 to 2.

Examples of the alkoxy group include a methoxy group, an ethoxy group, a propoxy group, a butoxy group, a pentyloxy group, a hexyloxy group, and the like.

Examples of the aforementioned substituted amino group include mono-substituted, di-substituted, or tri-substituted amino groups having one or more substituents selected from a hydrocarbon group (e.g., an alkyl group, a heteroalkyl group, a cycloalkyl group, an alkenyl group, an aryl group, etc.). Among them, mono-substituted, di-substituted, or tri-substituted amino groups having one or more substituents selected from the aforementioned alkyl group and aryl group are preferred.

The carbon number of each alkyl group that is the substituent which the substituted amino group has is preferably 1 to 6, more preferably 1 to 3, and still more preferably 1 to 2.

The ring-forming carbon number of each aryl group that is the substituent which the substituted amino group has is preferably 6 to 18, and more preferably 6 to 12.

Specifically, examples of the substituted amino group include a methylamino group, a dimethylamino group, a methylethylamino group, a diethylamino group, a trimethylamino group, a triethylamino group, a phenylamino group, a diphenylamino group, a triphenylamino group, a phenyl-1-naphthylamino group, a phenyl-2-naphthylamino group, a methylphenylamino group, a phenyl-t-butylamino group, and the like.

Examples of the aforementioned substituted silyl group include mono-substituted, di-substituted, or tri-substituted silyl groups having one or more substituents selected from a hydrocarbon group (e.g., an alkyl group, a heteroalkyl group, a cycloalkyl group, an alkenyl group, an aryl group, etc.) and an alkoxy group. Among them, mono-substituted, di-substituted, or tri-substituted silyl groups having one or more substituents selected from the aforementioned alkyl group, aryl group, and alkoxy group are preferred.

The carbon umber of each alkyl group that is the substituent which the substituted silyl group has is preferably 1 to 6, more preferably 1 to 3, and still more preferably 1 to 2.

The ring-forming carbon number of each aryl group that is the substituent which the substituted silyl group has is preferably 6 to 18, and more preferably 6 to 12.

The carbon umber of each alkoxy group that is the substituent which the substituted silyl group has is preferably 1 to 6, more preferably 1 to 3, and still more preferably 1 to 2.

Specifically, examples of the substituted silyl group include a methylsilyl group, a dimethylsilyl group, a methylethylsilyl group, a diethylsilyl group, a trimethylsilyl group, a triethylsilyl group, a phenylsilyl group, a diphenylsilyl group, a triphenylsilyl group, a phenyl-1-naphthylsilyl group, a phenyl-2-naphthylsilyl group, a methylphenylsilyl group, a phenyl-t-butylsilyl group, a methoxysilyl group, a dimethoxysilyl group, a methoxyethoxysilyl group, a diethoxysilyl group, a trimethoxysilyl group, a triethoxysilyl group, and the like.

In the case where $R^A$, $R^B$, and $R^C$ are each a hydrocarbon group having a substituent or an alkoxy group having a substituent, examples of the substituent include a halogen atom (e.g., a fluorine atom, a chlorine atom, a bromine atom, or an iodine atom), a hydroxy group, a cyano group, a nitro group, an amino group, a thiol group, an epoxy group, a carboxy group, and the like.

The substituent may also be the substituent selected from the aforementioned alkyl group, cycloalkyl group, alkenyl group, aryl group, alkoxy group, substituted amino group, and substituted silyl group.

Namely, $R^A$, $R^B$, and $R^C$ may also be each a hydrocarbon group or an alkoxy group, each of which is substituted with another kind of substituent as in, for example, an alkyl group substituted with an aryl group or an alkyl group substituted with a substituted silyl group.

In an embodiment of the present invention, the component (A) may be an inorganic polysilazane-based compound composed of only the repeating unit represented by the general formula (1), in which $R^A$, $R^B$, and $R^C$ are all a hydrogen atom, or may also be an organic polysilazane-based compound including the repeating unit represented by the general formula (1), in which any one or more of $R^A$, $R^B$, and $R^C$ are a group other than a hydrogen atom.

However, the component (A) which is used in an embodiment of the present invention is preferably an organic polysilazane-based compound, and more preferably an organic polysilazane-based compound having the repeating unit represented by the general formula (1), in which $R^A$ and $R^B$ are each a hydrogen atom or an unsubstituted or substituted alkyl group having a carbon number of 1 to 10 (preferably 1 to 6, and more preferably 1 to 3), and $R^C$ is a group other than a hydrogen atom.

It is preferable that the component (A) which is included in the antifouling composition as an embodiment of the present invention includes an organic polysilazane-based compound (A1) having at least a repeating unit represented by the following general formula (1-1), and it is more preferable that the component (A) is the organic polysilazane-based compound (A1).

The organic polysilazane-based compound (A1) may be a compound including a chain structure having the repeating unit represented by the following general formula (1-1), or may be a compound including a cyclic structure having the repeating unit represented by the following general formula (1-1).

The organic polysilazane-based compound (A1) may be a compound including only one kind or two or more kinds of the repeating unit represented by the following general formula (1-1).

(1-1)

The content of the organic polysilazane-based compound (A1) is preferably 60 to 100% by mass, more preferably 70 to 100% by mass, still more preferably 80 to 100% by mass, yet still more preferably 90 to 100% by mass, and especially preferably 100% by mass relative to the total amount (100% by mass) of the component (A) included in the antifouling composition.

In the general formula (1-1), p is an integer of 0 to 3, preferably an integer of 0 to 1, and more preferably 0.

$R^{A1}$ and $R^{B1}$ are each independently a hydrogen atom or an unsubstituted or substituted hydrocarbon group.

Examples of the hydrocarbon group which may be selected for $R^{A1}$ and $R^{B1}$ include the same hydrocarbon groups which may be selected for $R^A$, $R^B$, and $R^C$ in the general formula (1).

In the case where the hydrocarbon group has a substituent, examples of the substituent include the same substituents which the hydrocarbon group which may be selected for $R^A$, $R^B$, and $R^C$ in the general formula (1) may have.

In an embodiment of the present invention, $R^{A1}$ and $R^{B1}$ are each independently preferably a hydrogen atom or an unsubstituted or substituted alkyl group having a carbon number of 1 to 10 (preferably 1 to 6, and more preferably 1 to 3).

$L^{C1}$ is a single bond, an unsubstituted or substituted alkylene group, or $—(CH_2)_q—NH—(CH_2)_r—$, wherein q and r are each independently an integer of 0 or more, preferably an integer of 0 to 10, more preferably an integer of 0 to 4, and still more preferably an integer of 2 to 3.

The carbon number of the alkylene group is preferably 1 to 10, more preferably 1 to 6, still more preferably 1 to 4, and yet still more preferably 2 to 3.

The alkylene group may be either a linear alkylene group or a branched alkylene group and is preferably a linear alkylene group.

Examples of the alkylene group include a methylene group, an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, a n-decylene group, and the like.

In the case where the alkylene group has a substituent, examples of the substituent include the same substituents which the hydrocarbon group which may be selected for $R^A$, $R^B$, and $R^C$ in the general formula (1) may have.

$R^{D1}$s are each independently a hydrogen atom, an unsubstituted or substituted alkyl group having a carbon number of 1 to 10 (preferably 1 to 6, and more preferably 1 to 3), an unsubstituted or substituted alkenyl group having a carbon number of 1 to 10 (preferably 1 to 6, and more preferably 1 to 3), or an unsubstituted or substituted aryl group having a ring-forming carbon number of 6 to 18 (preferably 6 to 15, and more preferably 6 to 12).

$R^{E1}$s are each independently a hydrogen atom, an alkyl group having a carbon number of 1 to 10 (preferably 1 to 6, and more preferably 1 to 3), an alkenyl group having a carbon number of 1 to 10 (preferably 1 to 6, and more preferably 1 to 3), or an aryl group having a ring-forming carbon number of 6 to 18 (preferably 6 to 15, and more preferably 6 to 12), with an alkyl group having a carbon number of 1 to 10 (preferably 1 to 6, and more preferably 1 to 3) being preferred.

In the case where plural $R^{D1}$s are present, the plural $R^{D1}$s may be the same as or different from each other. Similarly, in the case where plural $R^{E1}$s are present, the plural $R^{E1}$s may be the same as or different from each other.

Specific examples of the alkyl group, the alkenyl group, and the aryl group, each of which may be selected for $R^{D1}$ and $R^{E1}$, include the same groups exemplified for those which may be selected for $R^A$. $R^B$, and $R^C$ in the general formula (1).

In the case where each of the alkyl group, the alkenyl group, and the aryl group has a substituent, examples of the substituent include the same substituents which the hydrocarbon group which may be selected for $R^A$, $R^B$, and $R^C$ in the general formula (1) may have.

The organic polysilazane-based compound (A1) is preferably a compound (A11) having the repeating unit represented by the general formula (1) together with the repeating unit represented by the general formula (1-1).

The repeating unit represented by the general formula (1), which the compound (A11) has, is preferably the repeating unit represented by the general formula (1), which $R^A$, $R^B$, and $R^C$ are each a hydrogen atom or an unsubstituted or substituted alkyl group having a carbon number of 1 to 10 (preferably 1 to 6, and more preferably 1 to 3).

<Both Terminal Carboxy-Modified Silicone (B)>

Any compound is useful as the both terminal carboxy-modified silicone (B) which is used in the present invention so long as it is a silicone compound having a carboxy group in the both terminals of a main chain including a siloxane bond (—Si—O—Si—).

The component (B) may be used either alone or in combination of two or more thereof.

In the present invention, by preparing the antifouling composition including the both terminal carboxy-modified silicone (B) among carboxy-modified silicones together with the polysilazane-based compound (A), the surface state of the sheet-like antifouling layer formed of the antifouling composition can be improved. In addition, even when a tilt angle against the antifouling layer is small, excellent water repellency such that the water droplets adhered to the antifouling layer can be slipped off can be imparted.

On the other hand, in the case of using a single terminal carboxy-modified silicone or a side chain carboxy-modified silicone, in an antifouling layer formed of the resulting antifouling composition, when a tilt angle is small, the water droplets adhered to the antifouling layer cannot be slipped off, so that the water repellency is inferior.

In the antifouling composition of the present invention, the content of the component (B) is 0.01 to 10 parts by mass based on 100 parts by mass of the total amount of the component (A).

In the case where the content of the component (B) is less than 0.01 parts by mass, in an antifouling layer formed of the resulting antifouling composition, when a tilt angle is small, the water droplets adhered to the antifouling layer cannot be slipped off, so that the water repellency is inferior.

On the other hand, in the case where the content of the component (B) is more than 10 parts by mass, in coating the resulting antifouling composition onto a resin film or the like, cissing is liable to be generated, and the surface state or curability of the formed antifouling layer is inferior.

In an embodiment of the present invention, from the viewpoint of providing the antifouling composition which may form an antifouling layer with excellent water repellency such that even when a tilt angle is small, the water droplets adhered can be slipped off, the content of the component (B) is preferably 0.1 parts by mass or more, more preferably 0.3 parts by mass or more, still more preferably 0.6 parts by mass or more, and yet still more preferably 1.1 parts by mass or more based on 100 parts by mass of the total amount of the component (A).

On the other hand, in an embodiment of the present invention, from the viewpoint of providing the antifouling composition which may form an antifouling layer with excellent surface state and curability, the content of the component (B) is preferably 8.5 parts by mass or less, more preferably 6.5 parts by mass or less, still more preferably 5.0 parts by mass or less, and yet still more preferably 4.0 parts by mass or less based on 100 parts by mass of the total amount of the component (A).

A viscosity at 25° C. of the both terminal carboxy-modified silicone (B) which is used in an embodiment of the present invention is preferably 50 to 2,100 mm$^2$/s, more preferably 70 to 1,500 mm$^2$/s, still more preferably 100 to 1,000 mm$^2$/s, and yet still more preferably 120 to 500 mm$^2$/s.

In the present specification, the viscosity at 25° C. of the component (B) is a value as measured at 25° C. according to the standard "ASTM 445 Appendix C".

A carboxy group equivalent of the both terminal carboxy-modified silicone (B) which is used in an embodiment of the present invention is preferably 1,000 to 5,000 g/mol, more preferably 1,500 to 3,800 g/mol, still more preferably 1,700 to 3,500 g/mol, and yet still more preferably 1,900 to 3,000 g/mol.

From the viewpoint of providing the antifouling composition which may form an antifouling layer with excellent surface state and curability as well as the viewpoint of providing the antifouling composition which may form an antifouling layer with excellent water repellency such that even when a tilt angle is small, the water droplets adhered can be slipped off, it is preferable that the component (B) which is included in the antifouling composition as an embodiment of the present invention includes a compound (B1) represented by the following general formula (2), and it is more preferable that the component (B) is the compound (B1).

(2)

The content of the compound (B1) is preferably 60 to 100% by mass, more preferably 70 to 100% by mass, still more preferably 80 to 100% by mass, yet still more preferably 90 to 100% by mass, and especially preferably 100% by mass relative to the total amount (100% by mass) of the component (B) included in the antifouling composition.

In the general formula (2), n is an integer of 1 or more.

$L^1$ and $L^2$ are each independently an unsubstituted or substituted alkylene group or an unsubstituted or substituted oxyalkylene group.

$R^1$ to $R^6$ are each independently a hydrogen atom, an unsubstituted or substituted alkyl group having a carbon number of 1 to 10, an unsubstituted or substituted aryl group having a ring-forming carbon number of 6 to 24, an unsubstituted or substituted haloalkyl group having a carbon number of 1 to 10, or an unsubstituted or substituted alkylaryl group having a carbon number of 7 to 25.

In the case where plural $R^3$s and $R^4$s are present, the plural $R^3$s and $R^4$s may be the same as or different from each other, respectively.

In the case where each of the "alkylene group" and the "oxyalkylene group" which may be selected for $L^1$ and $L^2$, and each of the "alkyl group", the "aryl group", the "haloalkyl group", and the "alkylaryl group" which may be selected for $R^1$ to $R^6$ have a substituent, examples of the substituent include a hydroxy group, a cyano group, a nitro group, an amino group, a thiol group, an epoxy group, a carboxy group, the aforementioned alkyl groups, the aforementioned cycloalkyl groups, the aforementioned alkenyl groups, the aforementioned aryl groups, and the aforementioned alkoxy groups.

The carbon number of the aforementioned alkylene group which may be selected for $L^1$ and $L^2$ is preferably 1 to 10, more preferably 1 to 6, still more preferably 1 to 4, and yet still more preferably 1 to 2.

The alkylene group may be either a linear alkylene group or a branched alkylene group and is preferably a linear alkylene group.

Examples of the alkylene group include the groups exemplified for the alkylene group, which may be selected for $L^{C1}$ in the general formula (1-1). Among them, a methylene group, an ethylene group, a n-propylene group, an isopropylene group, a n-butylene group, or an isobutylene group is preferred; a methylene group or an ethylene group is more preferred; and an ethylene group is still more preferred.

The carbon number of the aforementioned oxyalkylene group which may be selected for $L^1$ and $L^2$ is preferably 1 to 6, more preferably 1 to 4, and still more preferably 1 to 3.

The oxyalkylene group may be either a linear oxyalkylene group or a branched oxyalkylene group and is preferably a linear oxyalkylene group.

Examples of the oxyalkylene group include an oxymethylene group, an oxyethylene group, an oxypropylene group, an oxyisopropylene group, an oxybutylene group, an oxypentylene group, an oxyhexylene group, and the like. Among them, an oxymethylene group, an oxyethylene group, or an oxypropylene group is preferred.

$L^1$ and $L^2$ are each independently preferably an unsubstituted or substituted alkylene group, more preferably an unsubstituted alkylene group, and still more preferably an unsubstituted linear alkylene group.

The carbon number of the aforementioned alkyl group which may be selected for $R^1$ to $R^6$ is preferably 1 to 10, more preferably 1 to 6, still more preferably 1 to 3, and yet still more preferably 1 to 2.

The alkyl group may be either a linear alkyl group or a branched alkyl group.

Examples of the alkyl group include the groups exemplified for the alkyl group, which may be selected for $R^A$, $R^B$, and $R^C$ in the general formula (1). Among them, a methyl group or an ethyl group is preferred.

The ring-forming carbon number of the aforementioned aryl group which may be selected for $R^1$ to $R^6$ is preferably 6 to 24, more preferably 6 to 18, still more preferably 6 to 15, and yet still more preferably 6 to 12.

Examples of the aryl group include the groups exemplified for the aryl group, which may be selected for $R^A$, $R^B$, and $R^C$ in the general formula (1). Among them, a phenyl group is preferred.

The carbon number of the aforementioned haloalkyl group which may be selected for $R^1$ to $R^6$ is preferably 1 to 10, more preferably 1 to 6, still more preferably 1 to 3, and yet still more preferably 1 to 2.

The haloalkyl group may be either a linear haloalkyl group or a branched haloalkyl group.

Examples of the haloalkyl group include the aforementioned alkyl groups in which one or more hydrogen atoms are substituted with a halogen atom (e.g., a fluorine atom, a chlorine atom, a bromine atom, or an iodine atom). Specifically, examples thereof include a chloromethyl group, a 1-chloroethyl group, a 2-chloroethyl group, a 2-chloroisobutyl group, a 1,2-dichloroethyl group, a 1,3-dichloroisopropyl group, a 2,3-dichloro-t-butyl group, a 1,2,3-trichloropropyl group, a bromomethyl group, a 1-bromoethyl group, a 2-bromoethyl group, a 2-bromoisobutyl group, a 1,2-dibromoethyl group, a 1,3-dibromoisopropyl group, a 2,3-dibromo-t-butyl group, a 1,2,3-tribromopropyl group, an iodomethyl group, a 1-iodoethyl group, a 2-iodoethyl group, a 2-iodoisobutyl group, a 1,2-diiodoethyl group, a 1,3-diiodoisopropyl group, a 2,3-diiodo-t-butyl group, a 1,2,3-triiodopropyl group, a fluoromethyl group, a 1-fluoromethyl group, a 2-fluoromethyl group, a 2-fluoroisobutyl group, a 1,2-difluoroethyl group, a difluoromethyl group, a trifluoromethyl group, a pentafluoroethyl group, a perfluoroisopropyl group, a perfluorobutyl group, and the like.

The carbon number of the aforementioned alkylaryl group which may be selected for $R^1$ to $R^6$ is preferably 7 to 25, more preferably 7 to 20, still more preferably 7 to 16, and yet still more preferably 7 to 13.

The alkyl moiety which the alkylaryl group has may be either linear or branched.

Examples of the alkylaryl group include a 2-methylphenyl group, a 3-methylphenyl group, a 4-methylphenyl group, a 3-isopropylphenyl group, a 4-isopropylphenyl group, a 4-butylphenyl group, a 4-isobutylphenyl group, a 4-t-butylphenyl group, a 4-hexylphenyl group, a 4-cyclohexylphenyl group, a 4-octylphenyl group, a 4-(2-ethylhexyl)phenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,4-di-t-butylphenyl group, a 2,6-di-t-butylphenyl group, a 2,4-di-t-pentylphenyl group, a 2,5-di-t-octylphenyl group, a 2,4,5-trimethylphenyl group, a 2,4,6-trimethylphenyl group, a 2,4,6-triisopropylphenyl group, and the like.

$R^1$ to $R^6$ are each independently preferably a hydrogen atom or an unsubstituted or substituted alkyl group, and more preferably a hydrogen atom or an unsubstituted alkyl group.

The antifouling composition as an embodiment of the present invention may contain a single terminal carboxy-modified silicone compound having a carboxy group in only a single terminal of one side of a main chain including a siloxane bond (—Si—O—Si—), or a side chain carboxy-modified silicone compound not having a carboxy group in a terminal of a main chain including a siloxane bond (—Si—O—Si—) but having a carboxy group in only a side chain thereof within a range where the advantageous effects of the present invention are not impaired.

However, the content of the aforementioned single terminal carboxy-modified silicone compound is preferably 0 to 20 parts by mass, more preferably 0 to 10 parts by mass, still more preferably 0 to 5 parts by mass, yet still more preferably 0 to 2 parts by mass, and especially preferably 0 part by mass based on 100 parts by mass of the total amount of the component (B) in the antifouling composition.

The content of the aforementioned side chain carboxy-modified silicone compound is preferably 0 to 20 parts by mass, more preferably 0 to 10 parts by mass, still more preferably 0 to 5 parts by mass, yet still more preferably 0 to 2 parts by mass, and especially preferably 0 part by mass based on 100 parts by mass of the total amount of the component (B) in the antifouling composition.

Furthermore, the total content of the silicone-based compound which is not corresponding to the component (B) is preferably 0 to 30 parts by mass, more preferably 0 to 20 parts by mass, still more preferably 0 to 10 parts by mass, yet still more preferably 0 to 5 parts by mass, and especially preferably 0 part by mass based on 100 parts by mass of the total amount of the component (B) in the antifouling composition.

<Organic Solvent Solution (C) Having Hydrogen Chloride Dissolved Therein>

From the viewpoint of more improving the curability of the antifouling layer formed of the antifouling composition, it is preferred that the antifouling composition as an embodiment of the present invention further includes an organic solvent solution (C) having hydrogen chloride dissolved therein.

Since the component (C) has a function as an acid catalyst, when the component (C) is blended, it is possible to accelerate hydrolysis of reactive functional groups which the component (A) and the component (B) have, thereby forming the antifouling layer with excellent curability.

Though there is a case where hydrochloric acid (an aqueous solution having hydrogen chloride dissolved therein) or the like is generally used as the acid catalyst, when the content of water in the antifouling composition is large, there is a tendency that the antifouling composition is excessively cured, so that the surface state of the antifouling layer formed of the antifouling composition is inferior.

As the organic solvent for dissolving hydrogen chloride therein, it is preferred to include at least one solvent selected from the group consisting of an ether-based solvent and acetic acid; it is more preferred to include only at least one solvent selected from the group consisting of an ether-based solvent and acetic acid; and it is still more preferred to include only at least one solvent selected from an ether-based solvent.

The organic solvent may be a single solvent composed of only one kind, or may be a mixed solvent of two or more thereof.

Examples of the ether-based solvent include diethyl ether, dipropyl ether, diisopropyl ether, butyl methyl ether, butyl ethyl ether, butyl propyl ether, dibutyl ether, diisobutyl ether, butyl methyl ether, butyl ethyl ether, butyl propyl ether, dipentyl ether, diisoamyl ether, cyclopentyl methyl ether, cyclohexyl methyl ether, cyclopentyl ethyl ether, cyclohexyl ethyl ether, cyclopentyl propyl ether, cyclopentyl-2-propyl ether, cyclohexyl propyl ether, cyclohexyl-2-propyl ether, cyclopentyl butyl ether, cyclopentyl-butyl ether, cyclohexyl butyl ether, cyclohexyl-butyl ether, anisole, diphenyl ether, and the like.

The ether-based solvent may also be a cyclic ether, such as tetrahydrofuran, dioxane, etc.

From the viewpoint of solubility with hydrogen chloride as well as the viewpoint of obtaining the antifouling composition capable of more improving the curability of the antifouling layer to be formed, the carbon number of the ether-based solvent is preferably 2 to 15, more preferably 3 to 12, and still more preferably 4 to 8.

Among them, the ether-based solvent is preferably at least one selected from diethyl ether, dibutyl ether, and cyclopentyl methyl ether from the viewpoint of obtaining the antifouling composition capable of more improving the curability of the antifouling layer to be formed.

Examples of other organic solvent than the ether-based solvent and acetic acid include methyl ethyl ketone, methyl isobutyl ketone, ethyl acetate, toluene, and the like.

The content of the solvent selected from the group consisting of an ether-based solvent and acetic acid is preferably 60 to 100% by mass, more preferably 70 to 100% by mass, still more preferably 80 to 100% by mass, and yet still more preferably 90 to 100% by mass relative to the total amount (100% by mass) of the organic solvent in the antifouling composition.

From the viewpoint of obtaining the antifouling composition capable of more improving the curability of the antifouling layer to be formed, the content of the hydrogen chloride in the antifouling composition as an embodiment of the present invention is preferably 0.01 to 10 parts by mass, more preferably 0.05 to 5 parts by mass, and still more preferably 0.1 to 2 parts by mass based on 100 parts by mass of the total amount of the component (A) and the component (B).

In the case where the antifouling composition as an embodiment of the present invention includes the component (C), the antifouling composition is in a form of solution.

In the case where the antifouling composition as an embodiment of the present invention is in a form of solution, the concentration of the active components of the solution of the antifouling composition is preferably 10 to 90% by mass, more preferably 20 to 80% by mass, and still more preferably 30 to 70% by mass.

It is preferred to blend the component (C) by suitably adjusting its blending amount such that the content of the hydrogen chloride in the antifouling composition and the concentration of the active components of the solution of the antifouling composition fall within the aforementioned ranges.

<Other Additives>

The antifouling composition as an embodiment of the present invention may contain any other additive than the aforementioned components (A) to (C) within a range where the advantageous effects of the present invention are not impaired.

Examples of other additives include a curing agent, a polymerization initiator, an anti-aging agent, a light stabilizer, a flame retardant, an electroconductive agent, an antistatic agent, a plasticizer, and the like.

The content of each of these additives is preferably 0 to 20% by mass, more preferably 0 to 10% by mass, still more preferably 0 to 5% by mass, and yet still more preferably 0 to 2% by mass relative to the total amount (100% by mass) of the active components included in the antifouling composition.

The antifouling composition as an embodiment of the present invention may further contain a resin component which is not corresponding to the aforementioned component (A) and component (B). The resin component as referred to herein indicates a polymer having a number average molecular weight of 1,000 or more, and a polymer resulting from polymerization of a polymerizable compound with light or heat is also included.

The content of the resin component is preferably 0 to 90% by mass, more preferably 0 to 50% by mass, and still more preferably 0 to 10% by mass relative to the total amount (100% by mass) of the active components included in the antifouling composition.

The total content of the component (A) and the component (B) in the antifouling composition as an embodiment of the present invention is preferably 10% by mass or more, more preferably 50% by mass or more, still more preferably 65% by mass or more, yet still more preferably 80% by mass or more, and even yet still more preferably 90% by mass or more, and preferably 99.9% by mass or less, and more preferably 99.0% by mass or less relative to the total amount (100% by mass) of the active components included in the antifouling composition.

The presence of water or an alcohol in the antifouling composition as an embodiment of the present invention causes excessive curing of the antifouling composition, so that the surface state of the antifouling layer formed of the antifouling composition tends to be inferior. Thus, it is preferred that the content of water or the alcohol is small as far as possible.

The content of water in the antifouling composition as an embodiment of the present invention is preferably 5% by mass or less, more preferably 3% by mass or less, still more preferably 1% by mass or less, and yet still more preferably 0.1% by mass or less relative to the total amount (100% by mass) of the antifouling composition inclusive of the solvent.

The content of the alcohol in the antifouling composition as an embodiment of the present invention is preferably 5% by mass or less, more preferably 3% by mass or less, still more preferably 1% by mass or less, and yet still more preferably 0.1% by mass or less relative to the total amount (100% by mass) of the antifouling composition inclusive of the solvent.

The "alcohol" as referred to in the present specification means a compound represented by R—OH (R is an alkyl group or a cycloalkyl group), and specifically, examples thereof include methanol, ethanol, and the like.

From the viewpoint of environmental aspects, the content of a fluorine-containing compound in the antifouling composition as an embodiment of the present invention is preferably less than 10% by mass, more preferably less than 5% by mass, still more preferably less than 1% by mass, and yet still more preferably less than 0.01% by mass relative to the total amount (100% by mass) of the active components included in the antifouling composition.

<Characteristics of Antifouling Composition>

The antifouling composition of the present invention is able to form the antifouling layer with excellent surface state and curability within a short period of time because its curing rate is appropriately fast.

For example, a curing time in curing a coating film formed of the antifouling composition as an embodiment of the present invention in an environment at 110° C. is typically within 30 minutes, preferably within 20 minutes, more preferably within 10 minutes, and still more preferably within 5 minutes.

[Configuration of Antifouling Sheet]

The antifouling sheet of the present invention is not particularly limited so long as it is of a configuration including the sheet-like antifouling layer formed of the aforementioned antifouling composition of the present invention.

Figure 1:
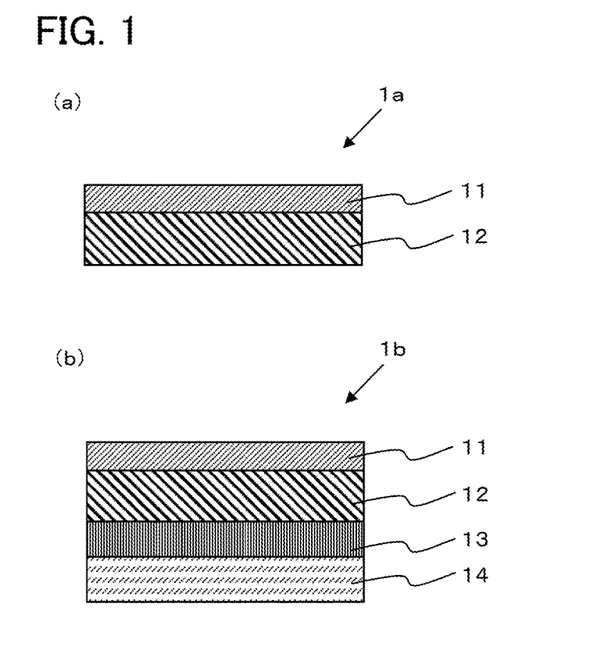
FIG. 1 illustrates cross-sectional views of antifouling sheets each having a substrate, as an embodiment of the present invention.

FIG. 1 illustrates cross-sectional views of antifouling sheets each having a substrate, as an embodiment of the present invention.

As the antifouling sheet having a substrate, there is exemplified an antifouling sheet 1a having a configuration in which an antifouling layer 11 is laminated on a substrate 12 as shown in FIG. 1(a).

In addition, the antifouling sheet may also be an antifouling sheet 1b in which a pressure sensitive adhesive layer 13 and a release material 14 are further provided on the surface opposite to that having the antifouling layer 11 of the substrate 12 as shown in FIG. 1(b).

In order to protect the antifouling layer 11 at the time of storage, a release material may be further provided on the antifouling layer 11 of this antifouling sheet 1a or 1b.

Figure 2:
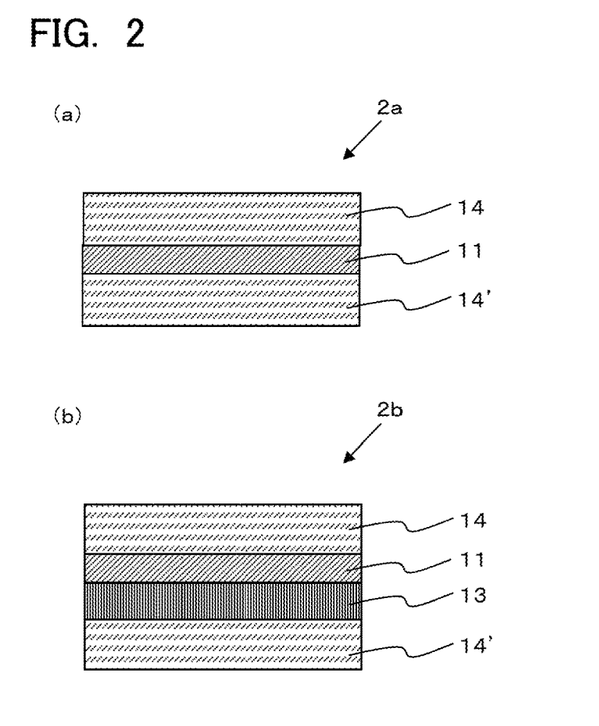
FIG. 2 illustrates cross-sectional views of antifouling sheets each not having a substrate, as an embodiment of the present invention.

FIG. 2 illustrates cross-sectional views of antifouling sheets each not having a substrate, as an embodiment of the present invention.

As the antifouling sheet not having a substrate, there is exemplified an antifouling sheet 2a having a configuration in which the antifouling layer 11 is sandwiched between two release materials 14 and 14' as shown in FIG. 2(a).

In addition, as shown in FIG. 2(b), the antifouling sheet may also be an antifouling sheet 2b in which the pressure sensitive adhesive layer 13 is further provided between the antifouling layer 11 and the release material 14' as shown in FIG. 2(b).

From the viewpoint of providing the antifouling sheet with excellent water repellency, the thickness of the antifouling layer which the antifouling sheet as an embodiment of the present invention has is preferably 0.001 to 40 µm, more preferably 0.005 to 25 µm, still more preferably 0.01 to 15 µm, and yet still more preferably 0.05 to 5 µm.

A water droplet slip angle that is a tilt angle at which in dropping water droplets on the surface of the antifouling layer of the antifouling sheet of the present invention, the water droplets can be slipped off is preferably 28° or less, more preferably 25° or less, still more preferably 20° or less, and yet still more preferably 15° or less.

The value of the water droplet slip angle means a value calculated by the method described in the Examples.

<Substrate>

Examples of the substrate which the antifouling sheet of the present invention has include a paper substrate, a resin film, a substrate prepared by laminating a paper substrate with a resin, and the like, and can be suitably selected in accordance with an application of the antifouling sheet.

In the antifouling composition of the present invention, as mentioned previously, even in the case where the coating film is formed on the resin film, it is possible to suppress the generation of cissing to form the sheet-like antifouling layer with a favorable surface state.

In view of the characteristics of the antifouling composition of the present invention, the substrate is preferably a resin film.

Examples of the paper which constitutes a paper substrate include thin paper, medium-quality paper, wood-free paper, impregnated paper, coated paper, art paper, parchment paper, glassine paper, and the like.

Examples of the resin which constitute a resin film include polyolefin resins, such as polyethylene, polypropylene, etc.; vinyl-based resins, such as polyvinyl chloride, polyvinylidene chloride, polyvinyl alcohol, an ethylene-vinyl acetate copolymer, an ethylene-vinyl alcohol copolymer, etc.; polyester-based resins, such as polyethylene terephthalate, polybutylene terephthalate, polyethylene naphthalate, etc.; polystyrene; an acrylonitrile-butadiene-styrene copolymer; cellulose triacetate; a polycarbonate; urethane resins, such as polyurethane, acryl-modified polyurethane, etc.; and the like.

Examples of the substrate prepared by laminating a paper substrate with a resin include laminate papers prepared by laminating the aforementioned paper substrate with a thermoplastic resin, such as polyethylene, etc.; and the like.

As the substrate which is used in the present invention, from the viewpoint of improving the adhesiveness thereof to the antifouling layer, a primer layer-provided substrate in which a primer layer is provided on the surface of the aforementioned substrate may also be used.

Examples of the component which constitutes the primer layer include a polyester-based resin, a urethane-based resin, a polyester urethane-based resin, an acrylic resin, and the like. These resins may be used either alone or in combination of two or more thereof.

In the case where the substrate which is used in the present invention is a resin film, from the viewpoint of improving the adhesiveness thereof to the antifouling layer, the surface of such a resin film may be subjected to a surface treatment, such as an oxidation method, a roughening method, etc., if desired.

The oxidation treatment is not particularly limited, and examples thereof include a corona discharge treatment method, a plasma treatment method, chromic acid oxidation (wet treatment), a flame treatment, a hot blast treatment, an ozone-UV ray irradiation treatment, and the like.

The roughening method is not particularly limited, and examples thereof include a sand blast method, a solvent treatment method, and the like.

Though such a surface treatment is suitably selected according to the kind of the substrate, from the viewpoint of improving the adhesiveness to the antifouling layer as well as the viewpoint of operability, a corona discharge treatment method is preferred.

The thickness of the substrate is suitably set according to an application of the antifouling sheet, and from the viewpoints of handleability and economic efficiency, it is preferably 10 to 250 µm, more preferably 15 to 200 µm, and still more preferably 20 to 150 µm.

The substrate which is used in the present invention may further contain a UV ray absorbent, a light stabilizer, an antioxidant, an antistatic agent, a slip agent, an antiblocking agent, a colorant, or the like.

<Release Material>

Examples of the release material which is used in the present invention include a release sheet prepared through a release treatment on the both surfaces of a substrate for release material, a release sheet prepared through a release treatment on one surface of a substrate for release material, and the like. The release treatment is preferably a method of coating a release agent on a substrate for release material to form a release agent film.

Examples of the substrate for release material include the aforementioned paper substrate, resin film, and substrate prepared by laminating a paper substrate with a resin, and the like.

Examples of the release agent include a silicone-based resin, an olefin-based resin, an isoprene-based resin, a rubber-based elastomer, such as a butadiene-based resin, etc., a long-chain alkyl-based resin, an alkyd-based resin, a fluororesin, and the like.

Though the thickness of the release material is not particularly limited, it is preferably 10 to 200 µm, and more preferably 25 to 150 µm.

<Pressure Sensitive Adhesive Layer>

In the case where the antifouling sheet as an embodiment of the present invention has a pressure sensitive adhesive layer, the pressure sensitive adhesive which constitutes the pressure sensitive adhesive layer can be suitably selected according to an application of the antifouling sheet.

Specifically, examples of the pressure sensitive adhesive include an acrylic pressure sensitive adhesive, an urethane-based pressure sensitive adhesive, a silicone-based pressure sensitive adhesive, a rubber-based pressure sensitive adhesive, a polyester-based pressure sensitive adhesive, a UV ray-curable type pressure sensitive adhesive, and the like.

These pressure sensitive adhesives may be used either alone or in combination of two or more thereof.

Though the thickness of the pressure sensitive adhesive layer is not particularly limited, it is preferably 1 to 100 µm, and more preferably 5 to 80 µm.

[Production Method of Antifouling Sheet]

The production method of the antifouling sheet of the present invention is not particularly limited, and examples thereof include a method for producing an antifouling sheet including coating the aforementioned antifouling composition of the present invention onto the substrate or release material by a known coating method to form a coating film and drying the coating film to form an antifouling layer.

In view of characteristics of the antifouling composition of the present invention, in an embodiment of the present invention, preferred is a method for producing an antifouling sheet, including the following Steps (1) to (3):

Step (1): a step of preparing the antifouling composition of the present invention;

Step (2): a step of forming a coating film on a substrate or a release material by using the antifouling composition; and Step (3): a step of curing the coating film in an environment at 70 to 150° C. to form a sheet-like antifouling layer.

<Step (1)>

The step (1) is a step of blending the aforementioned respective components to prepare an antifouling composition.

In the present step, though at least the component (A) and the component (B) are blended, from the viewpoint of accelerating a curing reaction in the step (3) as well as the viewpoint of making the workability in the step (2) favorable, it is preferred that the aforementioned component (C) is also blended.

In the case where the component (C) is blended, the antifouling composition is in a form of solution.

The antifouling composition may also be made in a form of solution by blending other organic solvent than the ether-based solvent and acetic acid, which is contained as the component (C).

However, from the viewpoint of preventing the occurrence of curing of the antifouling composition in the preparation stage in the step (2), it is preferred that water or alcohols are not used as the solvent.

Examples of such other solvent include organic solvents other than an alcohol, such as methyl ethyl ketone, methyl isobutyl ketone, ethyl acetate, toluene, etc.

<Step (2)>

The step (2) is a step of coating the antifouling composition prepared in the step (1) onto the aforementioned substrate or release material to form a coating film.

Examples of the coating method include a spin coating method, a spray coating method, a bar coating method, a knife coating method, a roll knife coating method, a roll coating method, a blade coating method, a die coating method, a gravure coating method, and the like.

The thickness of the coating film is suitably selected according to the desired thickness of the antifouling layer.

<Step (3)>

The step (3) is a step of curing the coating film formed in the step (2) in an environment at 70 to 150° C. to form a sheet-like antifouling layer.

As mentioned above, the drying temperature of the coating film is preferably 70 to 150° C., more preferably 80 to 140° C., and still more preferably 90 to 130° C.

When the drying temperature is 70° C. or higher, the curing reaction is readily accelerated. In addition, the solvent is readily volatilized and removed.

On the other hand, when the drying temperature is 150° C. or lower, the curing reaction of the coating film can be advanced while suppressing heat shrinkage of the substrate or release material.

Since the antifouling composition of the present invention is excellent in curing acceleration effect, the drying time required for drying at the aforementioned drying temperature can be shortened.

Though the drying time is suitably set according to the thickness of the formed antifouling layer, it is preferably 1 to 30 minutes, more preferably 1 to 20 minutes, and still more preferably 1 to 10 minutes.

In order to protect the surface of the antifouling layer at the time of storage, the release material may be further laminated on the formed antifouling layer.

By sticking a pressure sensitive adhesive layer formed on another release material onto the antifouling layer, a pressure sensitive adhesive layer-provided antifouling sheet can also be produced as in the antifouling sheet 1b of FIG. 1(b) or the antifouling sheet 2b of FIG. 2(b).

EXAMPLES

Examples 1 to 5 and Comparative Examples 1 to 7

(1) Preparation of Antifouling Composition

A polysilazane-based compound and a silicone-based compound of the kind and blending ratio (active component ratio, parts by mass) shown in Table 1 were blended (however, in Comparative Examples 1 and 7, the silicone-based compound was not blended), and the blend was diluted with an organic solvent of the kind and blending ratio shown in Table 1, thereby preparing a solution of an antifouling composition.

(2) Production of Antifouling Sheet

A polyethylene terephthalate (PET) film with a primer layer provided on one surface thereof (trade name "Cosmoshine A-4100" having a thickness of 50 μm, manufactured by Toyobo Co., Ltd.) was used as a substrate.

On the primer layer of this PET film, the above-prepared solution of antifouling composition was coated using a Mayer bar, to prepare a coating film, and the coating film was dried at 110° C. for 2 minutes, thereby producing an antifouling sheet having a sheet-like antifouling layer having a thickness of 1.5 μm.

In preparing the solution of antifouling composition in the Examples and Comparative Examples, details of the used respective components shown in Table 1 are as follows.

<Polysilazane-Based Compound>

"Polysilazane (1)": Trade name "KiON HTA1500 rapid cure", manufactured by Merck; an alkoxysilyl-modified polysilazane having repeating units represented by the following formulae (1a), (1b), and (1c), not containing a curing catalyst "Polysilazane (2)": Trade name "KiON HTA1500 slow cure", manufactured by Merck; an alkoxysilyl-modified polysilazane having repeating units represented by the following formulae (1a), (1b), and (1c), not containing a curing catalyst <Silicone-Based Compound>

"Both terminal carboxy-modified silicone": Trade name "X-22-162C", manufactured by Shin-Etsu Chemical Co., Ltd.; both terminal carboxy-modified silicone represented by the general formula (2), wherein $R^1$ to $R^6$ are each a methyl group, and $L^1$ and $L^2$ are each an ethylene group. Viscosity at 25° C.: 220 mm$^2$/s, carboxy group equivalent: 2,300 g/mol.

"Single terminal carboxy-modified silicone": Trade name "X-22-3710", manufactured by Shin-Etsu Chemical Co., Ltd.; a compound represented by the following formula (2b-1) (in the formula (2b-1), $R^{11}$ is a monovalent organic group; $R^{12}$ is a divalent organic group; and m is an integer of 1 or more). Viscosity at 25° C.: 60 mm$^2$/s, carboxy group equivalent: 1,450 g/mol.

"Side chain carboxy-modified silicone": Trade name "X-22-3701E", manufactured by Shin-Etsu Chemical Co., Ltd.; a compound represented by the following formula (2b-2) (in the formula (2b-2), $R^{21}$ is a divalent organic group; and m1 and m2 are each independently an integer of 1 or more). Viscosity at 25° C.: 2,000 mm$^2$/s, carboxy group equivalent: 4,000 g/mol.

(2b-1)

(2b-2)

<Solvent>

"HCl diethyl ether": Ether solution having 1M hydrogen chloride dissolved therein, in which hydrogen chloride is dissolved in diethyl ether.

"HCl cyclopentyl methyl ether": Ether solution having 1M hydrogen chloride dissolved therein, in which hydrogen chloride is dissolved in cyclopentyl methyl ether.

"DBE": Dibutyl ether

"Petroleum-based solvent": Mineral spirit

The antifouling layers formed of the antifouling compositions prepared and produced in the manner as above were evaluated for the characteristics thereof, according to the methods mentioned below. The results are shown in Table 1.

<Surface State of Antifouling Layer>

The surface of the coating film formed by coating the solution of antifouling composition prepared in each of the Examples and Comparative Examples on a substrate and the surface of the sheet-like antifouling layer obtained by drying the coating film were visually observed, and the surface state of the antifouling layer was evaluated according to the following criteria.

A: No cissing was seen, and a favorable coating film was formed. In addition, the surface state of the antifouling layer obtained by drying the coating film was also favorable.

B: Spot-like cissings having a diameter of 5 mm or less were seen in the formed coating film, but were on an acceptable level. In addition, the surface state of the antifouling layer obtained by drying the coating film was relatively favorable.

C: Cissings having a diameter of 5 mm or more were seen in the formed coating film, and therefore, the surface state of the antifouling layer obtained by drying the coating film was inferior, and the antifouling sheets were not on a usable level.

The antifouling sheets given the evaluation of "C" were not on a usable level, and therefore, they were not evaluated in point of the following "curability of antifouling layer" and "water droplet slip angle".

<Curability of Antifouling Layer>

The surface of the antifouling layer formed in each of the Examples and Comparative Examples was rubbed 20 times with a finger and then visually observed, and the curability of the antifouling layer was evaluated according to the following criteria. The case where a coating film formed of the antifouling composition was not cured, so that an antifouling layer was not formed was given the evaluation of "D".

A: There was seen no change in the color as compared with that before rubbing the antifouling layer with a finger.

B: The color was slightly changed white, but the change was on an acceptable level.

C: The color was changed white.

D: The antifouling film formed of the antifouling composition was not cured, so that an antifouling layer could not be formed.

The antifouling sheets given the evaluation of "C" or "D" were not on a usable level, and therefore, they were not evaluated in point of the following "water droplet slip angle".

<Water Droplet Slip Angle>

On the substrate side of the antifouling sheet produced in each of the Examples and Comparative Examples, water droplets were injected, and the antifouling sheet was, while stretched in wet, put on a sample table made of a glass plate in such a manner that the antifouling layer thereof was exposed out.

Then, 14 μL of pure water was dropped onto the surface of the antifouling layer of the antifouling sheet at a tilt angle of 0°, the tilt angle was gradually increased to incline the sample table, and a tilt angle at which the water droplets fell was defined as the water droplet slip angle. It may be said that as the water droplet slip angle was lower, an antifouling layer with more excellent water droplet slipping properties was formed.

TABLE 1

| | Composition of antifouling composition (parts by mass) | | | | | | |
|---|---|---|---|---|---|---|---|
| | | | Silicone-based compound | | | | |
| | | | Both | Single | Side | Solvent | |
| | Polysilazane-based compound | | terminal carboxy- | terminal carboxy- | chain carboxy- | HCl | HCl cyclopentyl |
| | Polysilazane (1) | Polysilazane (2) | modified slicone | modfied silicone | modified silicone | diethyl ether | methyl ether |
| Example 1 | 100 | — | 2.00 | — | — | 30 | — |
| Example 2 | 100 | — | 1.00 | — | — | 30 | — |
| Example 3 | 100 | — | 0.50 | — | — | 30 | — |
| Example 4 | — | 100 | 2.00 | — | — | 30 | — |
| Example 5 | 100 | — | 2.00 | — | — | — | 30 |
| Comparative Example 1 | 100 | — | — | — | — | 30 | — |
| Comparative Example 2 | 100 | — | — | 2.00 | — | 30 | — |
| Comparative Example 3 | 100 | — | — | — | 2.00 | 30 | — |

TABLE 1-continued

| | | | | | | | |
|---|---|---|---|---|---|---|---|
| Comparative Example 4 | 100 | — | 20.00 | — | — | 30 | — |
| Comparative Example 5 | — | 100 | — | 2.00 | — | 30 | — |
| Comparative Example 6 | — | 100 | — | — | 2.00 | 30 | — |
| Comparative Example 7 | 100 | — | — | — | — | — | — |

| | Composition of antifouling composition (parts by mass) | | HCl content* (% by mass) | Evaluation of antifouling layer | | |
|---|---|---|---|---|---|---|
| | Solvent | | | | | Water droplet slip angle (°) |
| | DBE | Petroleum-based solvent | | Surface state | Curability | |
| Example 1 | 72.8 | — | 1.04 | A | A | 12 |
| Example 2 | 71.8 | — | 1.05 | A | A | 18 |
| Example 3 | 71.2 | — | 1.06 | A | A | 24 |
| Example 4 | 72.8 | — | 1.04 | A | A | 15 |
| Example 5 | 72.8 | — | 1.04 | A | A | 12 |
| Comparative Example 1 | 72.8 | — | 1.07 | A | A | 46 |
| Comparative Example 2 | 72.8 | — | 1.04 | A | A | 32 |
| Comparative Example 3 | 72.8 | — | 1.04 | A | A | 51 |
| Comparative Example 4 | 90.0 | — | 0.89 | C | —*1 | —*1 |
| Comparative Example 5 | 72.8 | — | 1.04 | A | A | 30 |
| Comparative Example 6 | 72.8 | — | 1.04 | A | A | 38 |
| Comparative Example 7 | — | 99.4 | 0.00 | A | D | —*2 |

*Content ratio (% by mass) of HCl relative to the total amount (100% by mass) of the polysilazane-based compound and the silicone-based compound
*1Since the evaluation of the "surface state" was poor, the evaluations of the "curability" and "water droplet slip angle" were not performed.
*2Since the evaluation of the "curability" was poor, the evaluation of the "water droplet slip angle" was not performed.

As in Table 1, there were revealed such results that the antifouling layers formed of the antifouling compositions of Examples 1 to 5 were favorable in the surface state and curability and also low in the water droplet slip angle and excellent in the water repellency.

On the other hand, there were revealed such results that the antifouling layer formed of the antifouling compositions of Comparative Examples 1 to 3, 5, and 6 were high in the water droplet slip angle and inferior in the water repellency to those of the Examples.

In Comparative Example 4, since the surface state of the formed antifouling layer was poor, the evaluations of the curability and water droplet slip angle of the antifouling layer were not performed.

In addition, in Comparative Example 7, since the curability of the formed antifouling layer was poor, the evaluation of the water droplet slip angle of the antifouling layer was not performed.

INDUSTRIAL APPLICABILITY

The sheet-like antifouling layer formed of the antifouling composition of the present invention has favorable surface state and curability and also has excellent water repellency such that even when a tilt angle is small, the water droplets can be slipped off.

Accordingly, the antifouling sheet including the antifouling layer of the present invention is suitable, for example, as an antifouling sheet for preventing water droplets, stains, and the like that may hinder vision, from adhering to the surfaces of windows for buildings, windows for automobiles, windshields for cars, airplanes, ships, and the like, aquariums, ship bottom windows, undersea lives adhesion preventing films for ship bottoms, road panels such as soundproof walls, etc., mirrors installed in bathrooms or the like, and molded articles, such as glass chambers, glass accessories, etc.

REFERENCE SIGNS LIST 1a, 1b, 2a, 2b: Antifouling sheet
11: Antifouling layer
12: Substrate
13: Pressure sensitive adhesive layer
14, 14': Release material

The invention claimed is:
1. An antifouling composition comprising a polysilazane-based compound (A) and a both terminal carboxy-modified silicone (B),
   wherein a content of the silicone (B) is from 0.01 to 10 parts by mass based on 100 parts by mass of a total amount of the compound (A), and the antifouling composition is suitable for use as a sheet-like antifouling layer-forming material.
2. The antifouling composition according to claim 1, wherein the compound (A) comprises an organic polysila- zane-based compound (A1) having at least a repeating unit represented by formula (1-1):

(1-1)

wherein p is an integer of 0 to 3;

$R^{A1}$ and $R^{B1}$ are each independently a hydrogen atom or an unsubstituted or substituted hydrocarbon group;

$L^{C1}$ is a single bond, an unsubstituted or substituted alkylene group, or —$(CH_2)_q$—NH—$(CH_2)_r$—, wherein q and r are each independently an integer of 0 or more;

$R^{D1}$s are each independently a hydrogen atom, a hydroxyl group, an unsubstituted or substituted alkyl group having a carbon number of 1 to 10, an unsubstituted or substituted alkenyl group having a carbon number of 1 to 10, or an unsubstituted or substituted aryl group having a ring-forming carbon number of 6 to 18; and $R^{E1}$s are each independently an unsubstituted or substituted alkyl group having a carbon number of 1 to 10, an unsubstituted or substituted alkenyl group having a carbon number of 1 to 10, or an unsubstituted or substituted aryl group having a ring-forming carbon number of 6 to 18, provided that in the case where plural $R^{D1}$s are present, the plural $R^{D1}$s may be the same as or different from each other; and in the case where plural $R^{E1}$s are present, the plural $R^{E1}$s may be the same as or different from each other.

3. The antifouling composition according to claim 1, wherein the silicone (B) comprises a compound (B1) represented by formula (2):

(2)

wherein n is an integer of 1 or more;

$L^1$ and $L^2$ are each independently an unsubstituted or substituted alkylene group or an unsubstituted or substituted oxyalkylene group; and $R^1$ to $R^6$ are each independently a hydrogen atom, an unsubstituted or substituted alkyl group having a carbon number of 1 to 10, an unsubstituted or substituted aryl group having a ring-forming carbon number of 6 to 24, an unsubstituted or substituted haloalkyl group having a carbon number of 1 to 10, or an unsubstituted or substituted alkylaryl group having a carbon number of 7 to 25, provided that in the case where plural $R^3$s and $R^4$s are present, the plural $R^3$s and $R^4$s may be the same as or different from each other, respectively.

4. The antifouling composition according to claim 1, further comprising an organic solvent solution (C) having hydrogen chloride dissolved therein.

5. The antifouling composition according to claim 4, wherein the organic solvent in the organic solvent solution (C) is at least one selected from the group consisting of an ether-based solvent and acetic acid.

6. The antifouling composition according to claim 4, wherein a content of the hydrogen chloride is from 0.01 to 10 parts by mass based on 100 parts by mass of the total amount of the compound (A) and the silicone (B).

7. The antifouling composition according to claim 1, wherein a content of water in the antifouling composition is 5% by mass or less.

8. The antifouling composition according to claim 1, wherein in curing a coating film formed of the antifouling composition in an environment at 110° C., a curing time is within 30 minutes.

9. An antifouling sheet comprising a sheet-like antifouling layer formed of the antifouling composition according to claim 1.

10. The antifouling sheet according to claim 9, comprising the antifouling layer on a substrate.

11. The antifouling sheet according to claim 10, wherein the substrate is a resin film.

12. A method for producing an antifouling sheet, comprising:
preparing the antifouling composition according to claim 1;
forming a coating film on a substrate or a release material by using the antifouling composition; and
curing the coating film in an environment at 70 to 150° C. to form a sheet-like antifouling layer.

* * * * *